UNITED STATES PATENT OFFICE.

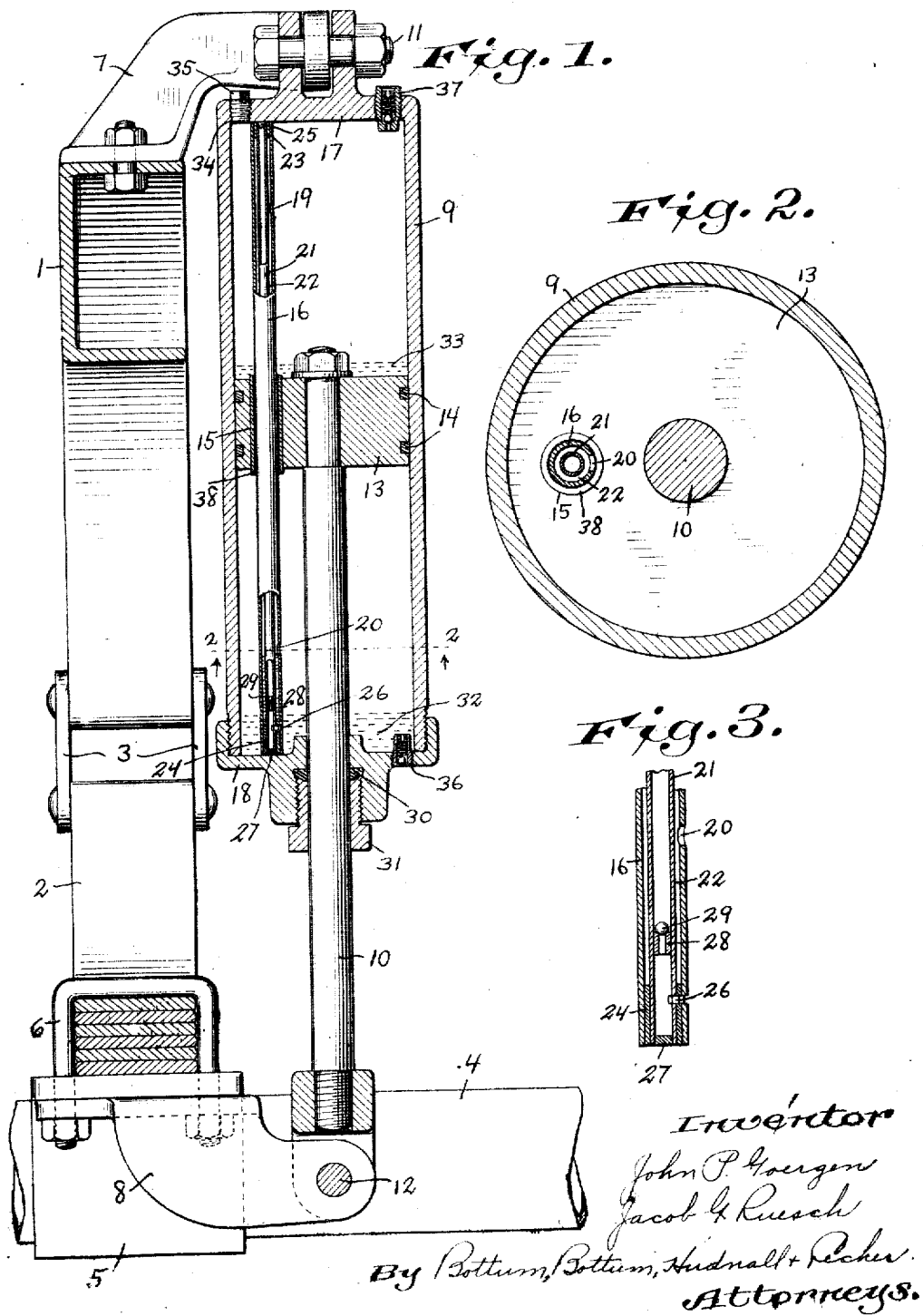

JOHN P. GOERGEN AND JACOB G. RUESCH, OF MILWAUKEE, WISCONSIN.

SHOCK-ABSORBER.

1,368,429.

Specification of Letters Patent. Patented Feb. 15, 1921.

Application filed October 19, 1917. Serial No. 197,401.

*To all whom it may concern:*

Be it known that we, JOHN P. GOERGEN and JACOB G. RUESCH, citizens of the United States, residing at Milwaukee, in the county of Milwaukee and State of Wisconsin, have invented certain new and useful Improvements in Shock-Absorbers, of which the following is a specification, reference being had to the accompanying drawing, forming a part thereof.

This invention relates to shock absorbers and the object of the invention is to improve the construction of shock absorbers in the manner to be hereinafter described and claimed.

Referring to the drawings which accompany this specification and form a part hereof, which drawings illustrate an embodiment of this invention, and on which drawings the same reference characters are used to designate the same parts wherever they may appear in each of the several views, Figure 1 is a vertical, transverse section of the shock absorber and parts of an automobile to which it is applied; Fig. 2 is a horizontal section, on an enlarged scale, on the line 2—2 on Fig. 1, looking in the direction indicated by the arrows; and Fig. 3 is a vertical section, on an enlarged scale, of a part of the apparatus.

Referring to the drawings, the reference numeral 1 designates a frame member of an automobile, 2 one of the springs, 3 shackles connecting the spring and frame member, 4 an axle, 5 an axle clip, and 6 a spring bolt. A bracket 7 is secured to the frame member 1 and a bracket 8 is secured to the spring 2 and axle 4. For simplicity of construction and as a matter of convenience in assembling, the bracket 8 may be secured to the axle clip 5 by the spring bolt 6. The bracket 7 is preferably located directly above the bracket 8. A cylinder 9 is hung from the bracket 7 and a piston rod 10 is fastened at one end to the bracket 8. The cylinder 9 and the piston rod 10 are connected with the brackets 7 and 8 by bolts 11 and 12 which are placed substantially at right angles with each other and one of which preferably extends substantially at right angles with the axle 4. This construction makes a suitable connection between the frame member 1 and the axle 4 to prevent the piston rod 10 from binding in the cylinder head. The bolts 11 and 12 and the lugs through which they are shown as passing are not closely fitted so the piston rod 10 can not bind or create excessive friction when the axle 4 moves with respect to the frame member 1. The piston rod 10 is secured to the piston 13 which is packed in any suitable manner as, for example, by the piston rings 14. The piston 13 is provided with an aperture 15 for the pipe 16. The pipe 16 is preferably of such a length that it extends from one cylinder head 17 to the other cylinder head 18 so that it may be firmly clamped between the cylinder heads. The pipe 16 is provided with apertures 19 and 20 above and below the piston 13 so that air can pass by the piston from one end of the cylinder to the other end of the cylinder through a restricted passageway so that movements of the piston will be resisted by the air compressed between the piston and the head of the cylinder toward which it moves in a well-known manner. The apertures 19 and 20 are preferably located at some distance from the ends of the pipe 16 to provide air cushioning spaces in the ends of the cylinder to offer more resistance to movements of the piston than is afforded by the restricted passageway heretofore referred to. A pipe 21 is inserted within the pipe 16 leaving a space 22 for the air to pass from aperture 19 to aperture 20 or vice versa. The ends of space 22 may be closed, and preferably are closed, by ferrules 23 and 24 which also serve to position pipe 21 within pipe 16 and to strengthen the ends of the pipes. These ferrules may be soldered, or otherwise secured to the ends of the pipes as it is preferred to have the joints air tight. The pipe 21 may be placed in communication with the ends of the cylinder on opposite sides of the piston 13 in any suitable manner. The drawings illustrate notches 25 and 26 cut through the pipes and ferrules. The lower notch 26 is placed high enough so that a pool of lubricant will remain in the lower end of the cylinder in contact with the piston rod to lubricate the same. A plug 27 closes the lower end of the pipe 21 to make an air tight joint and an upwardly opening check valve, composed of the perforated plug 28 and the ball 29, is located in the pipe 21 above the notch 26. The notch 25 should be small enough to prevent the passage of the ball 29 therethrough, in case the ball should be thrown to the top of the tube 21 by a sudden downward movement of the piston. The ball 29 should be of sufficiently less diameter than the pipe 21 to allow lubricant to pass it. The piston rod 10 is packed by packing 30 and the follower 31, and is further packed or sealed by the pool of lubricant 32. The piston 13 is also sealed by a pool of lubricant 33 above the same. Lubricant, preferably oil, is introduced into the cylinder through an aperture 34 which can be closed by a screwthreaded plug 35. The cylinder is provided with an air inlet valve 36 and an air outlet valve, or relief valve, 37. These valves are illustrated by the drawings as composed of screwthreaded cages provided with balls, springs and screwthreaded plugs. The tension of the springs can be regulated by the screwthreaded plugs. The function of the relief valve 37 is to allow air to escape from the cylinder, after the piston has reached and covered the aperture 19 in the pipe 16, and prevent the shock which would result from the air being compressed highly in the end of the cylinder. If some of the compressed air is allowed to escape, the pressure is diminished and the rebound of the piston on its return stroke is not so violent. The function of the air inlet valve 36 is to allow air to enter the cylinder to replace air which has escaped so that normally the cylinder will be full of air at substantially atmospheric pressure.

The operation of the shock absorber is as follows: Oil is poured into the cylinder through the aperture 34 and the plug 35 replaced. The relief valve 37 is adjusted to relieve excessive air pressure according to the construction and weight of the automobile. The oil will form a pool on top of the piston 13 and will lubricate the cylinder and piston as the piston moves within the cylinder and will form a seal to prevent air passing between the piston and the cylinder. When the piston moves in either direction, the air compressed by the piston can escape through the apertures 19 and 20 and the space 22 to the end of the cylinder from which the piston is moving. This escape is restricted so that the movements of the piston are cushioned. When the movement of the piston is so great that it covers either aperture 19 or aperture 20 in the pipe 16, the air which has been compressed can no longer escape to the opposite side of the piston through the apertures 19 and 20 and space 22 and excessive shocks would be experienced, due to the high compression of the air, if it were not for the relief valve 37 and the ball 29 in pipe 21. There are two principal shocks to be absorbed. One is due to the raising of the axle when running over an obstruction, for example. The other is due to the lowering of the axle, after it has been raised, by the tension of spring 2. When the piston 13 is raised so as to cover the aperture 19 in the pipe 16, the compressed air cannot pass to the lower side of the piston and the shock is resisted by the compressed air. The element of time enters into the transmission of shocks and the relief valve 37 opens, when the pressure is sufficiently high, so that the pressure is gradually reduced before the pressure of the compressed air has time to lift, or shock, the vehicle to any substantial extent. When the piston moves down so as to cover the aperture 20 in pipe 16, the air can escape gradually from beneath the piston to the upper part of the cylinder through the notches 26 and 25 and pipe 21. When the air pressure in the lower part of the cylinder is lowered sufficiently, the air inlet valve 36 opens and allows air to flow into the cylinder. In this way the cylinder is kept full of air at substantially atmospheric pressure and the creation of a vacuum by an upward movement of the piston is avoided. When the piston rises high enough, oil will flow from above the piston through the aperture 19 into the space 22 and overflow through the aperture 20 into the bottom of the cylinder. When the piston moves down sufficiently, oil will be pumped or forced from the bottom of the cylinder through notches 26 and 25 and pipe 21 to the upper part of the cylinder to maintain an oil pool and seal on top of the piston. The lower notch 26 is placed high enough so that a pool of oil will always be left to lubricate the piston rod and maintain a seal around the piston rod and the air inlet valve 36. Any kind of a suitable bushing or packing 38 can be interposed between the piston 13 and the pipe 16.

What is claimed is:

1. In a shock absorber, the combination with an upright cylinder provided with cylinder heads, of a piston and piston rod, the piston being provided with an aperture, a pipe passing through said aperture and clamped between the piston heads and provided with apertures to permit air to pass from one side of the piston to the opposite side thereof, a second pipe located inside the first mentioned pipe and provided with an upwardly opening check valve and communicating with the upper and lower parts of the cylinder, a relief valve in the upper part of the cylinder and an air inlet valve in the lower part of the cylinder, the communication between the second mentioned pipe and the lower part of the cylinder being below the check valve and high enough to permit a pool of lubricant to remain in the lower part of the cylinder to seal and lubricate the piston rod and to seal the air inlet valve.

2. In a shock absorber, the combination with a cylinder and piston, the cylinder being provided with a restricted passageway for permitting air to pass from either side of the piston to the opposite side thereof during a part of its stroke only in either direction, and means for relieving excessive air pressures generated in either end of the cylinder as the piston approaches the ends of the cylinder.

3. In a shock absorber, the combination with a cylinder and piston, the cylinder being provided with a restricted passageway for permitting air to pass from either side of the piston to the opposite side thereof, of additional means for permitting air to pass from one side of the piston to the opposite side thereof when the piston is moving in one direction.

In witness whereof we hereto affix our signatures.

JOHN P. GOERGEN.
JACOB G. RUESCH.